(12) United States Patent
Boursier et al.

(10) Patent No.: US 8,121,580 B2
(45) Date of Patent: Feb. 21, 2012

(54) METHOD OF SECURING A MOBILE TELEPHONE IDENTIFIER AND CORRESPONDING MOBILE TELEPHONE

(75) Inventors: Carine Boursier, Aubagne (FR); Pierre Girard, La Destrousse (FR)

(73) Assignee: Gemalto SA, Meudon (FR)

( * ) Notice: Subject to any disclaimer, the term of this patent is extended or adjusted under 35 U.S.C. 154(b) by 136 days.

(21) Appl. No.: 10/583,120

(22) PCT Filed: Dec. 14, 2004

(86) PCT No.: PCT/EP2004/053469
§ 371 (c)(1),
(2), (4) Date: Jun. 16, 2006

(87) PCT Pub. No.: WO2005/069658
PCT Pub. Date: Jul. 28, 2005

(65) Prior Publication Data
US 2007/0142086 A1 Jun. 21, 2007

(30) Foreign Application Priority Data
Dec. 19, 2003 (FR) ...................................... 03 15078

(51) Int. Cl.
*H04M 1/66* (2006.01)
*H04B 1/38* (2006.01)
(52) U.S. Cl. ......................... 455/410; 455/411; 455/558
(58) Field of Classification Search .................. 455/410, 455/411, 558
See application file for complete search history.

(56) References Cited

U.S. PATENT DOCUMENTS
2004/0043792 A1 * 3/2004 Simmons ..................... 455/558

FOREIGN PATENT DOCUMENTS
DE 100 26 326 A1 11/2001
FR 2 797 138 2/2001
GB 2355892 A * 5/2001

* cited by examiner

*Primary Examiner* — Kamran Afshar
*Assistant Examiner* — Omoniyi Obayanju
(74) *Attorney, Agent, or Firm* — Buchanan Ingersoll & Rooney PC

(57) ABSTRACT

A mobile telephone handset includes: a storage support which is secured against fraudulent access and which stores the IMEI of the handset. A connector for a secure electronic module is associated with an operator. A handset operating system controls authentication of the IMEI storage support by a secure electronic module which is connected to the aforementioned connector in order to establish a secure communication channel between the storage support and the module and transmission of the IMEI over the secure channel to the secure electronic module. The arrangement can be used to prevent the dynamic modification of the IMEI during the transmission thereof.

14 Claims, 1 Drawing Sheet

METHOD OF SECURING A MOBILE TELEPHONE IDENTIFIER AND CORRESPONDING MOBILE TELEPHONE

This disclosure is based upon French Application No. 03/15078 filed Dec. 19, 2003 and International Application No. PCT/EP2004/053469, filed Dec. 14, 2004, the contents of which are incorporated herein by reference.

BACKGROUND OF THE INVENTION

The invention relates to mobile telephone handsets and, more particularly, to techniques that aim to reduce the possibilities of reusing a stolen handset.

Theft of mobile telephone handsets has become a real social problem. This has entailed a massive increase of violent theft cases in public places in recent years, due to the theft of such handsets. It has been estimated, for example, that more than 150,000 mobile phones were stolen in 2001 in France alone. With a view to reducing this figure, the French authorities now demand that mobile telephone operators place an identifier of the stolen handsets on a black list. Every mobile handset has a unique identifier, called IMEI (International Mobile Equipment Identity), which is transmitted to the network used for communication. The IMEI of a handset reported as stolen is thus placed on a black list, which is already operational in France. When a handset included in the list attempts to establish communication, it can be blocked.

However, the IMEI is currently stored on a flash memory with poor security. In fact, there are software applications that allow a user to modify the IMEI of a handset, which are widely available on the internet. Therefore, as the European Commission has admitted, it is fairly easy to get around the creation of black lists of stolen handsets.

A technical recommendation by the ETSI proposes making it impossible to change the IMEI after the handset manufacturing process. This recommendation has been implemented mainly by recording the IMEI in a PROM, so that it cannot be physically modified.

This securitisation technique has certain drawbacks. Since the IMEI is read by the operating system of the handset, the use of a fraudulent operating system therefore makes it possible to modify the IMEI through the software in order to send the network a modified IMEI.

SUMMARY OF THE INVENTION

The invention aims to solve these disadvantages and therefore relates to a mobile telephone handset comprising:
- a storage support which is secured against fraudulent access, which stores the IMEI of the handset;
- a connector for a secure electronic module, which is associated with an operator;
- a handset operating system, which controls authentication of the IMEI storage support by a secure electronic module which is connected to the aforementioned connector in order to establish a secure communication channel between the storage support and the module and transmission of the IMEI over the secure channel to the secure electronic module.

According to a variant, the operating system controls the transmission of the IMEI to a mobile telephone operator by means of a secure OTA channel.

According to another variant, the handset comprises a secure electronic module associated with the operator connected to the connector. According to a further variant, the secure electronic module is a UICC.

It is also possible for the operating system to control authentication of the secure module by the storage support.

According to a variant, the secure electronic module and the storage support store encryption keys that are adapted to securing the secure communication channel.

According to another variant, the secure module blocks the use of the handset when a false IMEI is detected.

The invention also relates to a method of securing the IMEI of a mobile telephone handset comprising the following steps:
- authenticating a secure storage support by memorising its IMEI by means of a secure electronic module associated with the operator and inserted in a connector of the handset, in order to establish a secure channel between the storage support and the secure module;
- transmitting the IMEI from the storage support to the secure module over the secure channel.

According to a variant, the secure module also transmits the IMEI to a mobile telephone operator over a secure OTA channel.

According to a further variant, the operator compares the IMEI with a black list of stolen handsets, and blocks the communications of the handset when the handset appears on the black list.

According to another variant, the secure module blocks the use of the handset when a false IMEI is detected.

BRIEF DESCRIPTION OF THE DRAWINGS

Further special features and advantages of the invention will appear clearly from reading the description provided as a non-exhaustive example in relation to the appended drawings, in which.

The invention suggests using a secure channel to perform the authentication of a storage support (secured against fraudulent access and containing the IMEI in its memory) by means of a secure electronic module associated with the operator and connected to the mobile handset. Such a secure electronic module is typically presented in the form of a UICC (Universal Integrated Circuit Card), for example as a SIM card. The IMEI is only transmitted to the secure channel when the IMEI's storage support has been authenticated.

DETAILED DESCRIPTION

Figure 1:
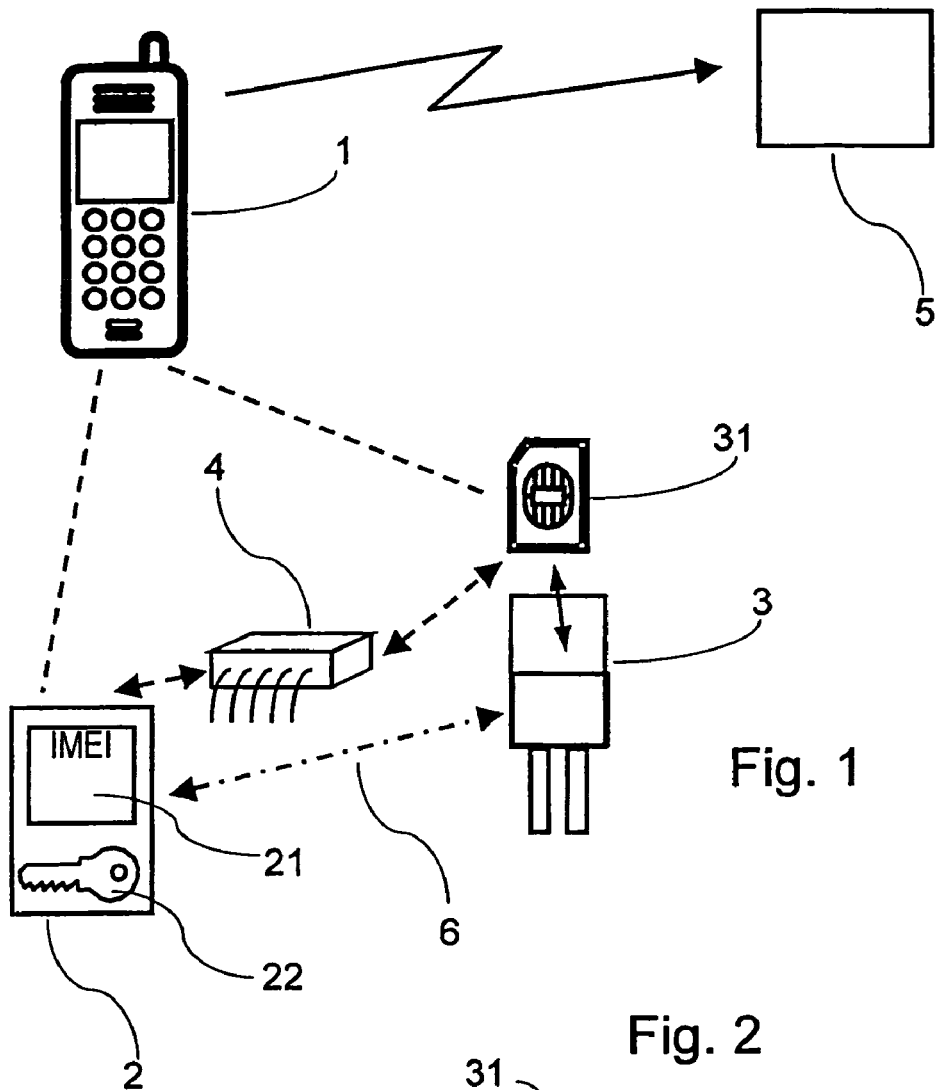
FIG. 1 shows the elements implemented according to one variant of the invention.

FIG. 1 thus shows a mobile telephone handset 1 according to the invention. The handset 1 comprises a storage support 2 secured against fraudulent access. This storage support 2 stores the IMEI 21 of the handset 1. The handset 1 also comprises a connector 3 for a secure electronic module such as a UICC 31. A secure communication channel 6 is established between the secure electronic module 31 connected to the connector 3 and the secure storage support 2. The secure communication channel 6 means that at least the secure module authenticates the storage support 2 using any suitable means and guarantees the integrity and the confidentiality of all the data exchanged. A handset operating system 4 controls the authentication of the IMEI 21 storage support 2 by the secure module 31 connected to the connector (identified as step 101 in FIG. 2), and controls the transmission of the IMEI over the secure channel 6 to this secure module 31 (identified as step 102 in FIG. 2).

The IMEI is thus secured against dynamic modifications during its transmission over the communication channel 6. The IMEI received by the module 31 can therefore be considered to have been authenticated since it comes from the authenticated storage support 2 and was transmitted over the secure communication channel 6.

Obviously, if the authentication of the storage support 2 of the IMEI by the secure electronic module 31 signals an error, this electronic module 31 can take any measures required to point out this error and prevent the handset from being used.

It is therefore possible to block the handset without requiring communication with the operator's network. The operator can, in particular, avoid having to manage the keys or certificates that are associated with a handset. Such a block is therefore easier to implement. The telephone can also be blocked in this way without requiring any modifications of the operator networks: the infrastructures and protocols of the existing network can thus be conserved.

The storage support 2 secured against fraudulent access can be of a known type, for example a PROM. The static integrity of the information it contains is thus guaranteed.

In order to secure the channel 6 and to perform any necessary authentications between the storage support 2 and the module 31, the support 2 and/or the module can store encryption keys adapted to the desired type of encryption or authentication. The types of encryption or authentication to be used are already known. It is possible, in particular, to consider using session keys or static keys.

The integrity of the IMEI can be protected by a cryptographic calculation, which will be sent over the secure channel 6 to the secure module 31.

The operating system 4 can be memorised in a ROM memory and executed by a microcontroller. The operating system 4 will preferably establish a secure channel between the support 2 and the secure module 31 at the time of switching on the telephone handset or prior to a call.

The operating system 4 can be configured so that the secure module 31 authenticates the handset and checks the integrity of the data transmitted to it. It is also possible to plan for the secure module 31 to be authenticated by the secure support 2 of the mobile 1 and also for it to check the integrity of the data transmitted to it.

It is also possible to provide cryptographic calculation means contained in the secure module 31.

Figure 2:
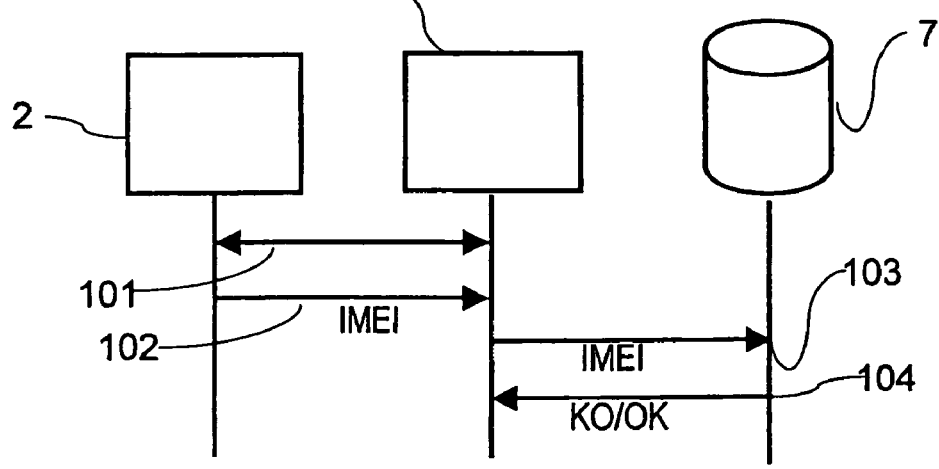
FIG. 2 shows a diagram that illustrates the exchanges and steps performed by the elements according to one variant of the invention.

Black lists should nevertheless continue to be used for taking blocking measures. The IMEI can, in particular, be transmitted from the secure module to the operator's network, possibly by using a secure channel between the secure module 31 and the operator or in order to compare the authenticated IMEI with a black list and possibly to obtain a command from the network to block the handset. In the example of FIG. 2, the IMEI is transmitted to a server 7 in step 103. The server determines whether this IMEI is present in its black list. In step 104, the server transmits to the handset an indication of whether or not the IMEI is in the list. An indication of whether or not the IMEI is in the list can correspond to a command from the server to block the handset. The server can obviously take any other measure required to disrupt the fraudulent user. The server can, in particular, disconnect the handset from the operator's communication network or command the secure module to stop generating keys for the handset.

Several modes can be provided for transmitting the IMEI between the secure module and the operator's network.

This transmission can be carried out, in particular, by means of the operator's communication network, intended for transmitting communications between users. In the example of FIG. 1, the transmission is carried out between the handset and an operator 5 of a communication network.

The transmission is preferably carried out over a secure channel, in order to increase the level of security of the transmission. It is possible, in particular, to use the secure OTA channel originally intended for transmitting secure SMS messages and used mainly for transferring applets to the secure module.

The invention claimed is:

1. A telephone handset, comprising:
   a storage support module storing an International Mobile Equipment Identity (IMEI) associated with an operator of a communication network;
   a secure electronic module;
   a processor;
   a memory device including program instructions that, when executed by the processor, control the handset to:
   authenticate, by the secure electronic module, the storage support module;
   establish, in the event the secure electronic module determines that the storage support module is authentic, a secure communication channel between the storage support module and the secure electronic module by means of encryption keys stored in the secure electronic module and the storage support module that are used to encrypt the secure communication channel;
   transmit, via the secure communication channel, the IMEI from the storage support module to the secure electronic module;
   transmit the IMEI to a mobile telephone operator by means of a secure OTA channel; and
   enable, by the secure electronic module, the handset to access the communication network.

2. The handset according to claim 1, wherein the secure electronic module is a UICC.

3. The handset according to claim 1, wherein the operating system controls the authentication of the secure electronic module by the storage support module.

4. The handset according to claim 1, wherein the secure electronic module blocks the use of the handset when a false IMEI is detected.

5. The handset according to claim 2, wherein the operating system controls the authentication of the secure electronic module by the storage support module.

6. The handset according to claim 2, wherein the secure electronic module blocks the use of the handset when a false IMEI is detected.

7. The handset according to claim 3, wherein the secure electronic module blocks the use of the handset when a false IMEI is detected.

8. The handset according to claim 1, wherein the secure electronic module blocks the use of the handset when a false IMEI is detected.

9. A method of securing a telephone handset, said method comprising:
   authenticating a storage support module by a secure electronic module, said storage support module storing an International Mobile Equipment Identity (IMEI) associated with the operator of a communication network;
   establishing, by a processor in the event the secure electronic module determines that the storage support module is authentic, a secure communication channel between the storage support module and the secure electronic module by means of encryption keys stored in the secure electronic module and the storage support module that are used to encrypt the secure communication channel;

transmitting, via the secure communication channel, the IMEI from the storage support module to the secure electronic module;

transmitting the IMEI to a mobile telephone operator by means of a secure OTA channel; and enabling, by the secure electronic module, the handset to access the communication network using the IMEI.

10. The method of claim 9, wherein the operator compares the IMEI with a black list of stolen handsets, and blocks the communications of the handset when the handset appears on the black list.

11. The method of claim 9, wherein the secure electronic module blocks the use of the handset when a false IMEI is detected.

12. The method of claim 9, wherein the secure electronic module blocks the use of the handset when a false IMEI is detected.

13. The method of claim 10, wherein the s secure electronic module blocks the use of the handset when a false IMEI is detected.

14. A telephone handset, comprising:

a storage support module storing an International Mobile Equipment Identity (IMEI) associated with the operator of a communication network;

a secure electronic module;

means for authenticating the storage support module by the secure electronic module;

means for establishing, in the event the means for authenticating determines that the storage support module is authentic, a secure communication channel between the storage support module and the secure electronic module by means of encryption keys stored in the secure electronic module and the storage support module that are used to encrypt the secure communication channel;

means for transmitting, via the secure communication channel, the IMEI from the storage support module to the secure electronic module;

means for transmitting the IMEI to a mobile telephone operator by means of a secure OTA channel; and means for enabling the handset to access the communication network using the IMEI.

\* \* \* \* \*